United States Patent [19]

Mueller et al.

[11] Patent Number: 4,816,343

[45] Date of Patent: Mar. 28, 1989

[54] CHEMICALLY STABILIZED FILM

[75] Inventors: Walter B. Mueller, Inman; Henry G. Schirmer, Spartanburg, both of S.C.

[73] Assignee: W. R. Grace & Co., Duncan, S.C.

[21] Appl. No.: 98,116

[22] Filed: Sep. 17, 1987

Related U.S. Application Data

[62] Division of Ser. No. 900,576, Aug. 26, 1986, Pat. No. 4,726,997.

[51] Int. Cl.$^4$ .................. B32B 27/08; B32B 27/36
[52] U.S. Cl. .................. 428/480; 428/483; 428/520; 428/522; 428/523
[58] Field of Search .................. 428/35, 480, 216, 349, 428/483, 520, 522, 523; 156/244.11, 244.23; 264/211.23, 211; 560/3

[56] References Cited

U.S. PATENT DOCUMENTS

| | | | |
|---|---|---|---|
| 4,058,663 | 11/1977 | Black | 560/3 |
| 4,188,443 | 2/1980 | Mueller et al. | 428/216 |
| 4,528,220 | 7/1985 | Hwo | 428/35 |
| 4,643,926 | 2/1987 | Mueller | 428/349 X |

Primary Examiner—Thomas J. Herbert
Attorney, Agent, or Firm—John J. Toney; William D. Lee, Jr.; Mark B. Quatt

[57] ABSTRACT

In a multilayer flexible film suitable for medical solution packaging, film-derived extractables are controlled by the use of a small amount of a high molecular weight stabilizer in the outer layer of the film. Solution pH can be controlled by the addition of a carbonate of an alkali metal to at least one intermediate adhesive layer and/or the core layer of the film.

8 Claims, No Drawings

CHEMICALLY STABILIZED FILM

This is a divisional application of application Ser. No. 900,576, filed on Aug. 26, 1986 U.S. Pat. No. 4,726,997.

This invention relates to autoclavable flexible films suitable for the packaging of medical solutions.

Currently, it is common medical practice to supply liquids such as medical solutions for parenteral administration in the form of disposable, flexible pouches. These pouches should be characterized by collapsibility, transparency, and adequate mechanical strength. They must also be able to resist the relatively high temperatures required for heat sterilization of their contents, for example in an autoclave. Typically, medical solutions and the like are autoclaved at about 253° F. for periods of 15 to 30 minutes.

Presently, such flexible pouches are typically made from a highly plasticized polyvinyl chloride. While meeting the requirements mentioned above, polyvinyl chloride may have some undesirable properties for use as a medical solution pouch because of the possibility of migration of plasticizer from the polyvinyl chloride into the medical solution or the other contents of the pouch so that the solution may become contaminated by potentially toxic material. A question has also arisen concerning whether PVC is adequately chemically neutral to medical solutions. It has also been found that polyvinyl chloride becomes brittle at relatively low temperatures.

Embrittlement and stress-cracking, particularly of the outer surface of medical pouches, has been found to occur in other non-PVC pouches. It is desirable to provide a pouch for the packaging of medical solutions which substantially reduces or eliminates stress-cracking and embrittlement of the pouch material.

One such pouch is made from a flexible film comprising a sealant layer of an ethylene propylene copolymer or modified ethylene propylene copolymer, a core layer of a very low density polyethylene, and an outer layer of a flexible copolyester. The core layer is adhered to the sealant and outer layers respectively with a suitable adhesive resin such as a modified ethylene vinyl acetate copolymer or a modified ethylene methacrylate copolymer.

An alternate structure includes a blend layer of about 50% very low density polyethylene and about 50% of a modified ethylene propylene copolymer between the sealant layer and core layer.

In packaging medical solutions, the amount of extractables in the medical solution from the packaging material must be strictly controlled. Similarly, a medical solution is often pH sensitive, and the pH of the solution must therefore also be kept within strict limits.

Of interest is U.S. Pat. No. 4,188,443 issued to Mueller et al disclosing a multilayer film of at least three layers, at least one of the inner layers comprising a copolymer or homopolymer of ethylene and at least one of the outer layers comprising a polyester or copolyester.

Of interest is U.S. Pat. No. 4,528,220 issued to Hwo disclosing a plastic bag for medical solutions comprising an outer and inner layer of blended materials, the blend of the outer layer having ethylene propylene copolymer as one component and the blend of the inner layer having ethylene propylene copolymer as one component.

Also of interest is the Condensed Chemical Dictionary, 10th Edition, at page 569 which describes Irganox as a series of complex, high molecular weight stabilizers that inhibit oxidation and thermodegradation of many organic materials.

It is an object of the present invention to provide a flexible film suitable for the packaging of medical solutions, in which extractables from the film are strictly controlled.

It is also an object of the present invention to provide a film suitable for the packaging of medical solutions, in which the pH of the medical solution in a pouch formed from the flexible film is relatively unaffected by the film.

DEFINITIONS

The terms "flexible" and the like and "elastomeric" and the like are used herein to define specific polymeric materials as well as characteristics of a resulting pouch or bag whereby improved flexibility and/or collapsibility of the pouch or bag is obtained by the use of these specific polymeric materials. Flexible materials may be characterized by a modulus of preferably less than 50,000 PSI (ASTM D-882-81) and more preferably less than 40,000 PSI (ASTM D-882-81).

The term "film" and the like refers to a thermoplastic material suitable for packaging and having one or more layers of polymeric materials which may be bonded by any suitable means well known in the art.

The term "polymer", "polymeric", and the like, unless specifically defined or otherwise limited, generally includes homopolymers, copolymers and terpolymers and blends and modifications thereof.

The term "very low density polyethylene" is used herein to define a copolymer of polyethylene with densities below 0.910 gm/cc, preferably between 0.900 to 0.906 g,cc. and including densities as low as 0.860 gm/cc, as measured by ASTM D-1505.

The term "ethylene vinyl acetate copolymer" (EVA) is used herein to refer to a copolymer formed from ethylene and vinyl acetate monomers wherein the ethylene derived units in the copolymer are present in major amounts and the vinyl acetate derived units in the copolymer are present in minor amounts.

The term "ethylene propylene copolymer" is used herein to refer to a copolymer formed from polypropylene monomer and minor amounts, usually less than 6%, of ethylene.

The term "copolyester" and the like is applied to polyesters synthesized from more than one diol and a dibasic acid. Copolyesters as used herein may also be characterized as copolymers of polyether and polyethylene terephthalate. More preferably copolyesters as used herein may be characterized as polymeric materials derived from 1,4 cyclohexane dimethanol, 1,4 cyclohexane dicarboxylic acid, and polytetramethylene glycol ether, or equivalents of any of the above, as reactants.

The term "modified" and the like is used herein to refer to a polymeric material in which some or all of the substituents are replaced by other materials, providing a change in properties such as improved flexibility or elastomeric properties.

SUMMARY OF THE INVENTION

In a multilayer flexible film comprising a sealant layer, a core layer of a polymeric material which imparts flexibility to the film, an outer layer of a flexible polyester or copolyester, and intermediate adhesive layers, the improvement comprises the inclusion in the outer layer of a high molecular weight stabilizer.

In another aspect of the invention, in a multilayer flexible film comprising a sealant layer, a core layer of a polymeric material which imparts flexibility to the film, an outer layer of a flexible polyester or copolyester, and intermediate layers comprising ethylene ester copolymers or modified ethylene ester copolymers, the improvement comprises the inclusion in at least one intermediate layer and/or core layer of a carbonate of an alkali metal.

DETAILED DESCRIPTION OF THE PREFERRED EMBODIMENTS

Thermoplastic film useful for packaging medical solutions must be not only flexible, but also able to withstand autoclaving temperatures during an autoclaving step typically employed after the film has been converted into a pouch, and a medical solution has been introduced into the pouch. One example of such a film is a multilayer film having a sealant layer, a core layer of a polymer which contributes flexibility to the film, and an outer layer of a flexible polyester or copolyester. Intermediate adhesive layers provide interlaminar bonding between the core layer and the sealant and outer layers respectively, holding the film together during and after autoclaving.

The sealant layer can be an ethylene propylene copolymer or modified ethylene propylene copolymer. Representative resins include M355E, a polyallomer ethylene propylene block copolymer available from Eastman, and Z4650, a modified ethylene propylene copolymer available from Cosden Oil and Chemical Company.

The core layer can be a very low density polyethylene such as DXFD 1362 available from Dow Chemical Company.

The outside layer is a flexible polyester or copolyester such as PCCE 9967 from Eastman Chemical Products, Inc.

The intermediate adhesive layers may be identical or differ from each other depending on the particular structure and application. CXA-E181 a modified ethylene vinyl acetate copolymer from Dupont, and Plexar 3382, modified ethylene methacrylate copolymer available from Norchem are examples of such adhesive materials. An alternate intermediate adhesive layer for bonding the sealant layer to the core layer may comprise a blend of about 50% Z4650 with about 50% of the same very low density polyethylene that comprises the core layer.

Limiting the amount of extractables that can migrate from the outer copolyester layer into a medical solution is of primary importance. Blending a high molecular weight stabilizer, such as Irganox 1010 available from Ciba-Geigy Corporation into the polyester or copolyester prior to extrusion of the film, limits the amount of extractables that enter the medical solution. Preferred ranges for the stabilizer are between about 0.3 and 1%, and preferably about 0.7% by weight of the copolyester.

Although Irganox 1010 is currently added to commercial copolyesters in the amount of about 0.2% by weight of the resin, it has been found that this amount of additive is insufficient to control the extraction of degraded copolyester material into medical solutions. Amounts of the high molecular weight stabilizer above about 1% by weight of the copolyester are not preferred because the additive itself can become an extractable material.

Many medical solutions are also pH sensitive and such solutions should not vary greatly in acidity or basicity. It is theorized that acetic acid may be produced in certain intermediate adhesive polymeric materials, and thereafter migrate into the packaged solution.

In accordance with the invention, preferably between about 0.05% and 0.15% of a carbonate of an alkali metal, preferably sodium, is blended into at least one of the intermediate adhesive resins prior to extrusion. More preferably, about 0.1% of a carbonate of an alkali metal, preferably sodium is blended into the modified EVA, or modified ethylene methacrylate copolymer.

Alternatively, preferably between about 0.005% and 0.015% of a carbonate of an alkali metal, preferably sodium, is blended into the very low density polyethylene or other polymeric material comprising the core layer of the flexible film. More preferably, about 0.01% sodium carbonate is blended into the very low density polyethylene.

It is theorized that the sodium carbonate neutralizes acetic acid or other acid components of the intermediate adhesive resins, and possibly the core layer resin.

The invention may be further understood by reference to the following examples showing actual embodiments of the invention.

EXAMPLE 1

About 0.6% of Irganox 1010 was blended with PCCE 9967. About .1% sodium carbonate was blended into a modified ethylene vinyl acetate copolymer, CXA E181. A five layer film was coextruded, the film having a sealing layer of M355E ethylene propylene block copolymer, a core layer of DXFD 1362, and the outer layer of PCCE 9967, with the intermediate adhesive layers of CXA E181.

EXAMPLE 2

About 0.6% of Irganox 1010 was blended into PCCE 9967 copolyester resin. About 0.1% sodium carbonate was blended into a CXA 181 resin.

A blend of 50% by weight DXFD 1362 and 50% by weight Z4650 was prepared, to which .1% sodium carbonate was added. A multilayer film was coextruded having a sealant layer of Z4650, a core layer of the DXFD 1362, an outer layer of the copolyester an adhesive layer between the core layer and sealant layer comprising the blend of 50% very low density polyethylene and 50% ethylene propylene copolymer, and an intermediate adhesive layer between the core layer and copolyester layer comprising CXA 181.

In examples 3 through 6, a multilayer coextruded film substantially like that of example 1 was prepared with varying levels of sodium carbonate in the core layer, i.e. the layer containing the very low density polyethylene. This film differed from example 1 in that CXA 190, a modified ethylene vinyl acetate copolymer was used in place of the CXA E181 of example 1. CXA 190 has 1000 ppm $Na_2CO_3$ in the resin itself. Also, examples 1 through 6 included 0.1% sodium carbonate in an additional sacrificial layer coextruded with an adhering to the multilayer film at the sealing layer of M355E ethylene propylene block copolymer. Finally, the copolyester layer contained 0.5% Irganox 1010 instead of the 0.6% level of example 1.

The film of examples 3 through 6 had a total thickness of 9.5 mils. This includes a core layer of 4.45 mils, intermediate adhesive layers of 0.4 mils each, a sealant layer of 0.75 mils, an outer layer of 1.5 mils, and a sacrificial layer of 2.0 mils thickness.

As seen in Table 1 below, increasing the sodium carbonate content of the core layer, with the remainder of the multilayer structure remaining constant, resulted in very significant improvement in the reduction of pH shift in the contained solution. The multilayer film described above was formed into a pouch having dimensions of 3.9 inches by 5.3 inches, and filled with 150 milliliters of water, then overwrapped with an 8 mil thick overwrap of polypropylene, and autoclaved at a temperature of 250° F. for 20 minutes.

The initial pH of the water was 5.96.

TABLE 1

| EXAMPLE | INITIAL pH | $Na_2CO_3$ (ppm) | FINAL pH | DROP IN pH |
|---|---|---|---|---|
| 3 | 5.96 | 0 | 4.89 | 1.17 |
| 4 | 5.96 | 50 | 5.01 | .95 |
| 5 | 5.96 | 100 | 5.45 | .51 |
| 6 | 5.96 | 200 | 5.68 | .28 | pH determinations were made on a pH meter according to USP 21 (page 1124).

A multilayer film was coextruded substantially like that of example 1 with a sealing layer thickness of 1.0 mils, intermediate adhesive layers each having a thickness of 0.5 mils, a core layer with a thickness of 4.75 mils, and an outer layer of a copolyester with a thickness of 1.75 mils. This multilayer material also included a 2.0 mil thick sacrificial layer of low density polyethylene as used in examples 3 through 6. This structure was irradiated with two megarads dosage of radiation and formed into a pouch with dimensions of 10 centimeters by 15 centimeters. The pouch was filled with 50 milliliters of distilled water, having an initial pH of 8.0. The pouch was overwrapped with a nylon polyethylene overwrap filled with water, and autoclaved at 250° F. for 20 minutes at 28psi over pressure. Example 7 listed in Table 2 below indicates the drop in pH as an average of three samples tested. No Irganox 1010 was blended in the outer copolyester layer, and no sodium carbonate was added to any of the other layers of example 7.

Example 8 was identical to example 7, but with the presence of 0.5% Irganox 1010 by weight in the outer layer, and 0.1% sodium carbonate in the intermediate adhesive layers and in the sacrificial layer.

Examples 9 and 10 in Table 2 below were substantially similar to examples 7 and 8 respectively, but with an initial pH of 6.5 in the contained water. The structures of claims 9 and 10 were irradiated to 5 megarads instead of 2 megarads.

All pH data represents an average of 3 samples for each example.

TABLE 2

| EXAMPLE | INITIAL pH | $Na_2CO_3$ (ppm) | FINAL pH | DROP IN pH |
|---|---|---|---|---|
| 7 | 8.0 | 0 | 4.2 | 3.8 |
| 8 | 8.0 | 1000 | 5.7 | 2.3 |
| 9 | 6.5 | 0 | 4.6 | 1.9 |
| 10 | 6.5 | 1000 | 5.7 | 0.8 |

Films in accordance with the present invention are preferably cross-linked. This is preferably done by irradiation, i.e. bombarding the film with particulate and non-particulate radiations such as high energy electrons from the accelerator to cross-link the materials of the film.

Cross-linking may also be accomplished chemically by the use of, for example, peroxides.

The detailed description and specific examples which indicate the presently preferred embodiments of the invention are given by way of illustration only. Various changes within the spirit and scope of the claims will become apparent to those of ordinary skill in the art upon review of the above detailed description and examples. For example, where two different intermediate adhesive layers are used, or where identical intermediate adhesive layers are extruded through separate extruders, the carbonate of an alkali metal can be blended with only one of the adhesive resins. The invention also contemplates the use of the carbonate of an alkali metal in either one or both of the intermediate adhesive layers, the core layer, or a combination of these.

What is claimed:

1. In a multilayer flexible film comprising a sealant layer, a core layer of very low density polyethylene, an outer layer of a flexible polyester or copolyester, and a first and a second intermediate adhesive layer, wherein said first adhesive layer bonds the core layer to the sealant layer and wherein said second adhesive layer bonds the core layer to the outer layer, said adhesive layers comprising ethylene ester copolymers or modified ethylene ester copolymers, the improvement comprising the inclusion in at least one intermediate layer of a carbonate of an alkali metal.

2. The improvement according to claim 1 wherein the alkali metal is sodium.

3. The improvement according to claim 1 wherein the carbonate of an alkali metal comprises between about 0.05% and 0.15% by weight of at least one of the first and second intermediate adhesive layers.

4. The improvement according to claim 3 wherein the carbonate of an alkali metal comprises about 0.10% by weight of at least one of the first and second intermediate adhesive layers.

5. In a multilayer flexible film comprising a sealant layer, a core layer of very low density polyethylene, an outer layer of a flexible polyester or copolyester, and a first and a second intermediate adhesive layer, wherein said first adhesive layer bonds the core layer to the sealant layer and wherein said second adhesive layer bonds the core layer to the outer layer, said adhesive layers comprising ethylene ester copolymers or modified ethylene ester copolymers, the improvement comprising inclusion in the core layer of a carbonate of an alkali metal.

6. The improvement according to claim 5 wherein the alkali metal is sodium.

7. The improvement according to claim 5 wherein the carbonate of an alkali metal comprises between about 0.005% and 0.015% by weight of the core layer.

8. The improvement according to claim 7 wherein the carbonate of an alkali metal comprises about 0.1% by weight of the core layer.

* * * * *

UNITED STATES PATENT AND TRADEMARK OFFICE
CERTIFICATE OF CORRECTION

PATENT NO. : 4,816,343
DATED : March 28, 1989
INVENTOR(S) : Walter B. Mueller
              Henry G. Schirmer It is certified that error appears in the above-identified patent and that said Letters Patent is hereby corrected as shown below:

In column 6, line 62, "0.1%" should read --0.01%--.

Signed and Sealed this

Third Day of October, 1989

Attest:

DONALD J. QUIGG

*Attesting Officer*     *Commissioner of Patents and Trademarks*